Nov. 21, 1933.    R. M. NARDONE    1,936,542
DRIVING MECHANISM
Filed July 7, 1930
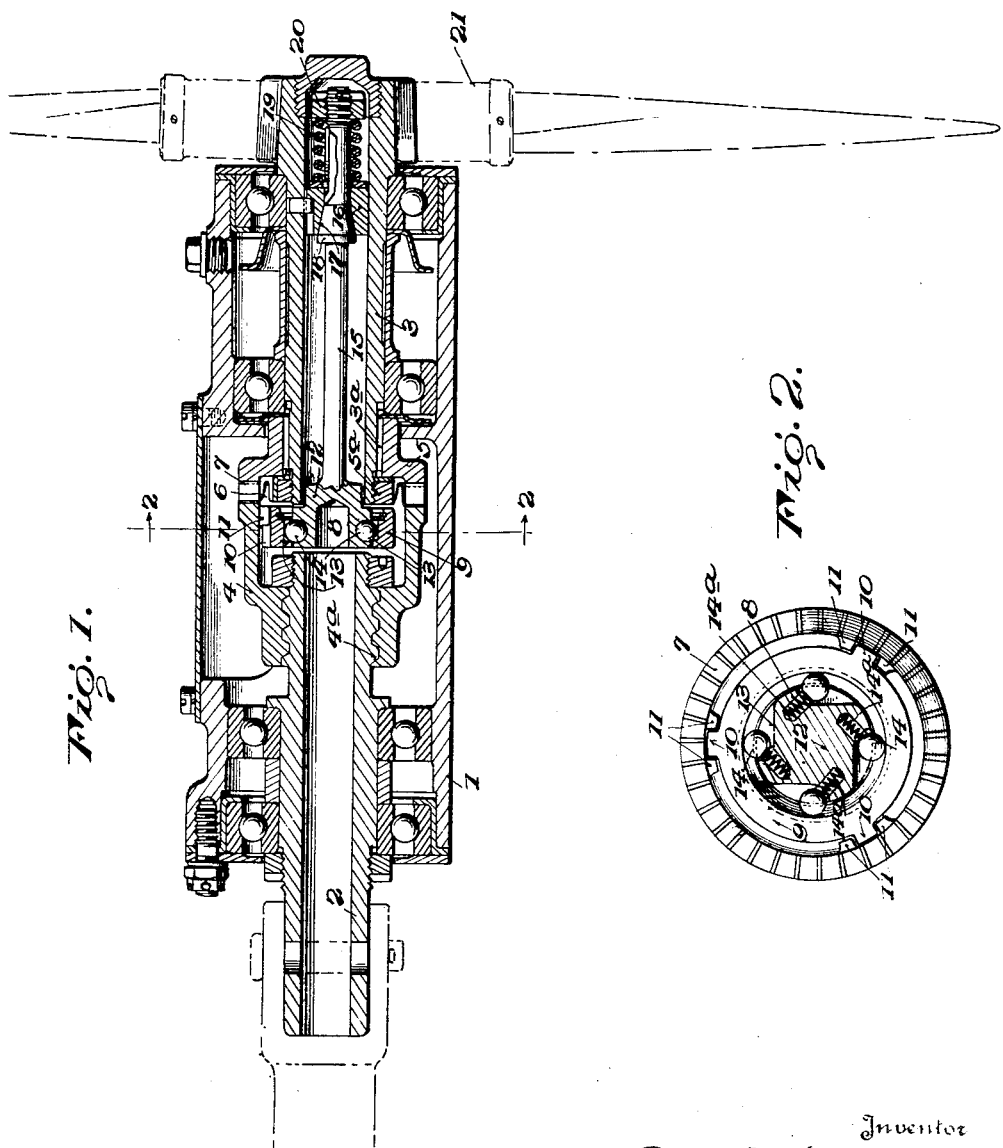
Inventor
Romeo M. Nardone
By F. B. Smith
Attorney Patented Nov. 21, 1933

1,936,542

UNITED STATES PATENT OFFICE 1,936,542

DRIVING MECHANISM

Romeo M. Nardone, East Orange, N. J., assignor to Eclipse Aviation Corporation, East Orange, N. J., a corporation of New Jersey Application July 7, 1930. Serial No. 466,323

11 Claims. (Cl. 74—7)

This invention relates to driving mechanisms and more particularly to driving mechanisms having means for drivably connecting and disconnecting a driving and a driven member.

One object of the present invention is to provide a driving mechanism in which novel means are employed for effecting a positive drivable connection between a driving and a driven member.

Another object of the invention is to provide in a driving mechanism of the above character, novel means whereby the inertia or resistance to rotation of the driven member may be utilized for effecting a drivable connection between the driving member and said driven member, and whereby positive engagement between said members may be insured.

Another object is to provide a driving mechanism of the above character wherein the inertia or resistance to rotation of the driven member is employed to cause relative rotation between the driving member and clutch means thereon, to effect engagement between the said clutch means and complementary clutch means on the driven member.

Still another object is to provide a driving mechanism comprising novel means for automatically disengaging the drivable connection between the driving and driven members upon discontinuance of the driving power to the driving member.

A further object is to provide in a driving mechanism of the above character novel means including a one-way clutch device for automatically disengaging the drivable connection between the driving and driven members.

A still further object is to provide a driving mechanism of the above character wherein the parts are so constructed as to secure positive and efficient operation together with minimum weight, the parts being assembled in a novel manner to obtain a compact arrangement capable of ready adaptability for driving aircraft propellers or other devices.

Other objects and features of novelty will appear more fully hereinafter from the following detailed description when taken in conection with the accompanying drawing. It is to be expressly understood, however, that the drawing is for purposes of illustration only and is not designed as a definition of the limits of the invention, reference being had for this purpose to the appended claims.

In the drawing, wherein like reference characters refer to like parts throughout the several views, Fig. 1 is an axial section of a driving mechanism embodying the present invention; and Fig. 2 is a section taken on the line 2—2 of Fig. 1 and showing more particularly the one-way clutch.

Referring to the drawing, and more particularly to Fig. 1 thereof, there is disclosed one form of driving mechanism embodying the present invention wherein a casing 1 is adapted to support a driving member or shaft 2 and a driven member or shaft 3, each of these last-named shafts being mounted for rotation in the casing by means of suitable anti-friction bearings.

Means are provided for drivably connecting the driving and driven shafts and, in the embodiment illustrated, such means include clutch sleeve members 4 and 5 which are mounted respectively on the driving and driven shafts in such a manner that relative rotation between the driving shaft and the sleeve 4 will result in longitudinal movement of the said sleeve on the drive shaft to thereby engage with or disengage from the sleeve 5 on the driven shaft. Inclined teeth 6 are provided on the end of sleeve 4 which are normally disengaged from but are adapted to engage similar teeth 7 on the sleeve 5, in order to secure a positive driving connection between the driving and driven shafts.

The above-referred to means for moving the sleeve member 4 longitudinally of the drive shaft and into and out of engagement with the sleeve 5 include a helical screw thread connection 4ª between the sleeve 4 and shaft 2, the pitch of this screw thread being such that upon rotation of the shaft 2 in the proper direction, the sleeve 4 will be moved longitudinally to the right, as viewed in Fig. 1, provided rotation of the said sleeve is prevented. The sleeve 5 is rigidly secured to shaft 3 in some suitable manner as for example, by means of a threaded nut 5ª and spline 3ª.

Means are provided for utilizing the inertia or resistance to rotation of the driven member to prevent rotation of he sleeve 4 when rotation of the drive shaft is initiated, to thereby cause longitudinal movement of sleeve 4 to effect clutching engagement with sleeve 5. Referring particularly to Fig. 2, such means are constituted by a one-way clutch device indicated generally at 8, the outer member 9 of which is formed with external teeth 10 adapted to constantly engage teeth 11 formed on the inner periphery of the end of the sleeve member 4, the said teeth 11 being of less axial length than the teeth 10 as shown in Fig. 1. The inner member 12 of the one-way clutch is provided on its outer periphery with tapered recesses or slots 13, which, with the inner periphery of the member 10 of the one-way clutch, form pockets to receive ball clutch members 14. These ball members 14 are normally resiliently urged by means of springs 14ª, into engagement with the inner periphery of member 9. It will be apparent that if clutch member 12 is held against rotation when the driving shaft 2 is rotated in a clockwise direction, as viewed in Fig. 2, the engagement between teeth 10 and 11 on the outer clutch member 9 and the sleeve 4 respectively will prevent rotation of sleeve 4, inasmuch as a clutching connection is set up between clutch members 9 and 12, the balls 14 being urged to the tapered ends of openings 13 by the tendency of member 9 to rotate clockwise. Accordingly, member 4 will be moved axially to the right, Fig. 1, into driving engagement with member 5.

In order to prevent rotation of the inner member 12 of the one-way clutch during the meshing operation between clutch members 4 and 5, the said first-named member is yieldably connected with the relatively stationary driven member 3. In the form shown, the inner clutch member 12 is provided with an integral extension rod 15, extending longitudinally and interiorly of the driven shaft 3. The driven shaft 3 may be provided interiorly thereof with a fixed member 16, through which rod 15 extends, and which is formed with a conical-shaped clutch surface 17 with which a similarly-shaped enlargement 18 on the rod 15 is adapted to cooperate. Resilient means such as a spring 19 may be tensioned between the fixed member 16 and a nut 20 adjustably threaded to the end of rod 15 in order to yieldably connect the driven shaft and inner member of the one-way clutch. By this arrangement the inertia or resistance to rotation of a propeller 21 or other driven member and the driven shaft, is transmitted through rod 15 to the one-way clutch member 12 to initially prevent the sleeve 4 from rotation, as hereinbefore set forth. In the event that teeth 6 and 7 do not mesh instantly, which is sometimes the case, further forward travel of sleeve member 4 is then prevented and teeth 10 and 11 always being in engagement, rotation will be imparted to one-way clutch member 9 and through the cooperating clutch member 12 to the shaft 15, the latter tending to produce rotation of the driven shaft 3 through cone clutch 16—18. Slippage takes place, however, between stationary clutch member 16 and its cooperating rotating member 18, so that shaft 3 tends to remain stationary, thus permitting further forward movement of sleeve member 4 and causing teeth 6 and 7 to mesh completely. The drive is then direct from driving shaft 2, through sleeve 4, teeth 6 and 7 and sleeve 5 to driven shaft 3. It will, therefore, be seen that the cone-clutch 16—18 performs two functions, first, to prevent initial rotation of sleeve member 4, and second, to insure positive engagement and meshing of teeth 6 and 7 when said sleeve member moves longitudinally thereby preventing driving of the shaft 3 through the one-way clutch mechanism 9 and 12.

In operation, it being understood that the clutch teeth 6 and 7 are normally disengaged and that teeth 10 and 11 are constantly engaged, rotation of the driving shaft 2 will cause the clutch member 4 to move axially to the right, Fig. 1, into driving engagement with the driven member 5, and, as pointed out above, the one-way clutch 9 prevents rotation of member 4 during such engaging operation.

The structure described above is also operative to effect the release of the driving connection between the driving and driven shafts in the event that the energization of the driving member is discontinued, or if the driven member should tend to become the driving member. Referring more particularly to Fig. 1, discontinuance of driving power to the driving shaft will result in an immediate decrease in the speed of said shaft, and the driven shaft, carrying the rapidly-rotating propeller or other driven member, will become the driving shaft and tend to drive what was heretofore the driving shaft. Referring now to Fig. 2, it will be seen that when, as in normal operation, the clutch member 9 rotates in a clockwise direction, the clutch member 12 will be driven in a clockwise direction, there being a clutching engagement between the two by reason of the balls 14 being forced to the smaller end of the openings 13. However, if the clutch member 12 tends to become the driving member, as it will when the speed of the driving engine or other power becomes less than that of the driven member, the balls 14 will be urged toward the enlarged ends of the openings 13 and clutching engagement between members 9 and 12 will be discontinued. In this condition members 9 and sleeve 4 are accordingly permitted to rotate freely. As the driven shaft tends to rotate the driving shaft, the inclined faces of teeth 6 and 7 will be effective to urge sleeve to the left, as viewed in Fig. 1, and as the speed of rotation of the driven shaft is relatively less than that of the sleeve 4, the threaded connection 4ª will be effective to move the said sleeve axially to the left, Fig. 1, and out of engagement with the sleeve 5.

It will thus be seen from the above that a novel mechanism has been provided whereby a positive driving engagement is automatically effected upon rotation of the driving member, and wherein such driving connection is also automatically released when the speed of the driving shaft becomes less than that of the driven member.

While reference has been made in certain instances that the device may be particularly adapted for use in connection with aircraft propellers, it is to be understood that the application of the invention is not limited to such use but may be employed wherever it is desired to drive any rotatable mechanism.

Through there has been illustrated and described only one embodiment of the invention, it is to be understood that the same is not limited to the form shown but may be embodied in various forms. It is also to be understood that various changes may be made in the construction and arrangement of the component parts constituting the invention without departing from the spirit thereof. Reference will, therefore, be had to the appended claims for a definition of the limits of the invention.

What is claimed is:

1. In a driving mechanism, a driving shaft, a hollow driven shaft having a clutch member formed therein, a longitudinally extending rod within the driven shaft having a clutch member formed on one end thereof and cooperating with the first-named clutch member, a one-way clutch having a member drivably connected with the other end of said rod, a longitudinally movable sleeve member having a screw-thread connection with the drive shaft, means for drivably connecting the sleeve and the other member of said one-way clutch, a sleeve member fixed to the driven shaft, and cooperating inclined teeth on said two last-named members permitting driving of the driven shaft by the driving shaft in one direction only.

2. In a driving mechanism, a driving shaft having a sleeve member threaded thereon for movement longitudinally thereof, a driven shaft having a sleeve member fixed thereto, cooperating means between said two sleeve members permitting rotation of said driven shaft in one direction only, a longitudinally extending rod mounted interiorly of the driven shaft and yieldably clutched with said driven shaft, and one-way clutch means between said rod and said first-named sleeve.

3. In a driving mechanism, a driving shaft, a driven shaft, each of said shafts having clutch members mounted thereon, cooperating means on said members permitting rotation of the driven shaft by the driving shaft, said clutch member on said driving shaft having a screw-thread connection whereby relative rotation between the driving shaft and said member will move said member longitudinally of the driving shaft, and means to cause said relative rotation between the driving shaft and said clutch member when the speed of the driving shaft becomes less than that of the driven shaft, whereby said cooperating means will be disengaged to prevent driving of the driving shaft by the driven shaft.

4. In a driving mechanism, a drive shaft, a driven shaft, means for drivably connecting said shafts comprising clutch members one on each of said shafts permitting rotation of said driven shaft by said drive shaft, teeth formed interiorly of one of said members and adapted to cooperate with teeth formed on one member of a one-way clutch, and means cooperating with the other member of said one-way clutch to initially prevent rotation of the last named member of said one-way clutch whereby one of said clutch members will be caused to cooperate with the other of said clutch members.

5. In a driving mechanism, a drive shaft, a driven shaft, means for drivably connecting the drive and driven shafts, a rod forming one member of a one-way clutch, the other member of said one-way clutch cooperating with a part of said means, and engaging means between said rod and said driven shaft whereby initial resistance to rotation of the driven shaft will cause engagement of said first-named means.

6. In a driving mechanism, a drive shaft, a driven shaft, cooperating clutch members on said drive and driven shafts, a second clutch means, means for drivably connecting one of said clutch members with said second clutch means, said connecting means comprising in part a third clutch means operatively connected with said second clutch means whereby initial resistance to rotation of the driven shaft will cause engaging movement of said cooperating clutch members.

7. In a driving mechanism, a drive shaft, a driven shaft, means for drivably connecting said shaft comprising a sleeve mounted on said drive shaft and an element engageable by said sleeve and mounted on said driven shaft, one-way clutch means including a member clutched to said driven shaft and a second member having teeth engaging said sleeve, and means for causing said sleeve to move longitudinally of said drive shaft into engagement with said element in response to the initial rotary movement of said drive shaft.

8. In combination with a driving shaft and a driven shaft, clutch means to effect a driving connection between the driving and driven shafts, means to automatically disengage said clutch means on discontinuance of the transmission of driving torque to the driving shaft, said means including a one-way clutch having a toothed outer race constantly engaging corresponding teeth on one element of said clutch means, an inner race drivably connected with said driven shaft, and a plurality of relatively movable overrunning elements disposed between said inner and outer races.

9. In combination, a rotatable shaft, a driven shaft, a rod extending through said driven shaft and drivably connected therewith, clutch means longitudinally movable of the rotatable shaft to effect a driving connection between the said shafts, and means to effect disengagement of said driving connection operative automatically upon cessation of the transmission of driving torque to the rotatable shaft, said last-named means including a one-way clutch, one element of which is integral with said rod.

10. In a driving mechanism, a drive shaft, a driven shaft, means for drivably connecting said shafts comprising releasable means mounted one on each of said shafts whereby said driven shaft may be driven by said drive shaft, a one-way clutch means including a member clutched to said driven shaft, a second member having teeth engaging the driving element of said releasable means, and cooperating means on said drive shaft and driving element for shifting the latter axially to engage the driven element thereof, said one-way clutch means being disposed substantially in concentric relation with said teeth.

11. In a driving mechanism, a drive shaft, a driven shaft, means for drivably connecting said shafts comprising releasable means mounted one on each of said shafts whereby said driven shaft may be driven by said drive shaft, a one-way clutch means having an inner race drivably connected to said driven shaft and an outer race clutched to the driving element of said releasable means, and means on said drive shaft for moving said driving element axially to engage the driven element of said releasable means.

ROMEO M. NARDONE.